United States Patent
Nakayama et al.

(10) Patent No.: US 7,095,432 B2
(45) Date of Patent: Aug. 22, 2006

(54) IMAGE PROCESSING APPARATUS AND METHOD

(75) Inventors: Hiromitsu Nakayama, Kanagawa-ken (JP); Susumu Kubota, Kanagawa-ken (JP); Yasuhiro Taniguchi, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 567 days.

(21) Appl. No.: 10/196,246

(22) Filed: Jul. 17, 2002

(65) Prior Publication Data

US 2003/0016287 A1    Jan. 23, 2003

(30) Foreign Application Priority Data

Jul. 18, 2001  (JP) ............................. 2001-218812

(51) Int. Cl.
*H04N 7/18*  (2006.01)

(52) U.S. Cl. .................................... 348/148

(58) Field of Classification Search ................ 348/148, 348/143, 119, 171, 149, 118; 382/153, 158, 382/156, 159, 104, 199, 103, 106, 22
See application file for complete search history.

(56) References Cited

U.S. PATENT DOCUMENTS

| | | | | |
|---|---|---|---|---|
| 5,097,329 A | * | 3/1992 | Hasegawa et al. | 348/171 |
| 5,122,957 A | * | 6/1992 | Hattori | 701/27 |
| 5,307,419 A | * | 4/1994 | Tsujino et al. | 382/153 |

FOREIGN PATENT DOCUMENTS

| | | |
|---|---|---|
| JP | 9-161065 | 6/1997 |
| JP | 09-218937 | 8/1997 |
| JP | 11-296660 | 10/1999 |
| JP | 20001-92970 | 4/2001 |

* cited by examiner

*Primary Examiner*—Vu Le
*Assistant Examiner*—Behrooz Senfi
(74) *Attorney, Agent, or Firm*—Oblon, Spivak, McClelland, Maier & Neustadt, P.C.

(57) ABSTRACT

An image input unit inputs a plurality of images in a time series. Each input image includes a boundary line extending toward a vanishing point on a plane. A reverse projection image generation unit generates a reverse projection image of each input image by projecting information related to each input image onto the plane. A boundary line detection unit detects the boundary line from the reverse projection image by identifying a boundary line candidate on each reverse projection image.

42 Claims, 17 Drawing Sheets

CAMERA IMAGE

| BOUNDARY LINE CANDIDATE SEGMENT | HORIZONTAL POSITION | | LINE WIDTH | AVERAGE EDGE INTENSITY | LENGTH ALONG VERTICAL DIRECTION |
| --- | --- | --- | --- | --- | --- |
| | STARTING POINT | END POINT | | | |
| BCS$_1$ | SP$_1$ | EP$_1$ | W$_1$ | EI$_1$ | L$_1$ |
| BCS$_2$ | SP$_2$ | EP$_2$ | W$_2$ | EI$_2$ | L$_2$ |
| ⋮ | ⋮ | ⋮ | ⋮ | ⋮ | ⋮ |

FIG.12

| PRIORITY DEGREE | BOUNDARY LINE CANDIDATE | CONTINUANCE TIME (FRAMES) | AVERAGE EDGE INTENSITY | DETECTION TIME (FRAMES) | DISAPPEARANCE TIME (FRAMES) | HORIZONTAL POSITION | | LINE WIDTH |
|---|---|---|---|---|---|---|---|---|
| | | | | | | STARTING POINT | END POINT | |
| 1 | BCa | 10 | EIa | 11 | 1 | SPa | EPa | Wa |
| 2 | BCb | 10 | EIb | 11 | 1 | SPb | EPb | Wb |
| . | . | . | . | . | . | . | . | . |
| . | . | . | . | . | . | . | . | . |

FIG.13

IMAGE PROCESSING APPARATUS AND METHOD

CROSS-REFERENCE TO RELATED APPLICATIONS

This application is based upon and claims the benefit of priority from the prior Japanese Patent Application PH2001-218812, filed on Jul. 18, 2001, the entire contents of which are incorporated herein by reference.

FIELD OF THE INVENTION

The present invention relates to image processing apparatus and method for stably detecting a boundary line existing on a lane from time series images input through TV camera or video camera.

BACKGROUND OF THE INVENTION

In the prior art, as a method for detecting a boundary line (white line) on a plane (road plane) from time series images input from a camera loaded on a vehicle, various kinds of image processing techniques are known.

As one method of a preprocessing method, the gradient of intensity values between the white line and the road plane is aimed. In this method, the edge intensity is binalized on a camera image (input image), and a white line candidate is restricted. For example, as for the binalized camera image, a plurality of templates of white lines are prepared, and the white line is detected by template matching. Alternatively, a plurality of white line candidates are prepared, and an assumed candidate for a white line on which most edge points exist is detected as the white line. In these methods, a threshold for binalization processing of edge intensity is set for preprocessing. However, it is difficult to set the threshold to the most suitable value irrespective of weather condition or illumination condition.

In the case of detecting a white line in front of the vehicle on the road, in general, the camera is set so that the optical axis of the camera is parallel to and lower than advancing direction of the vehicle. If the camera is set at this position, as shown in FIG. 1, a white line of the left side on the road plane is input as a curved line extended from the center neighborhood to the left lower side on the camera image. On the other hand, a white line of the right side on the road plane is input as a curved line extended from the center neighborhood to the right lower side on the camera image. In this case, as shown in FIGS. 2A, 2B, and 2C, the slope of the white line changes on the camera image in accordance with the vehicle's location on the road plane.

In the white line detection using a prior art template matching, a search area is set on the camera image in order to reduce the amount of calculations. However, it is necessary that the search area is adaptively changed because the slope of the white line on the camera image is changed by the vehicle's location. Accordingly, processing to set the search area is often complicated in the prior art.

In the same way, in the method for detecting the white line candidate in which most edge points exist as the white line, it is often necessary to set a direction of the white line candidate. However, processing to set the direction of the white line candidate is often complicated because the slope of the white line on the camera image is changed by the vehicle's location.

Furthermore, in the white line detection using the template matching, a width of the white line closer to the camera is different from that of a remote part on the camera image. In addition to this, in order to cope with a curved white line, many templates must be prepared. Additionally, the processing is complicated by selection of the suitable templates.

As mentioned-above, in the prior art, the following three problems exist.

(1) In a method for detecting a boundary line using a threshold processing such as binalization for edge detection, it is difficult to suitably set the threshold under a condition of bad weather, such as rainy weather. Accordingly, robust detection of the boundary line is difficult.

(2) In a method for detecting a boundary line on a time series images input from the camera, the slope of the white line on the camera image is changed by the vehicle's location on the road plane. Accordingly, processing to set the search area or the search direction is complicated, and the calculation load greatly increases.

(3) In a method for detecting a white line using template matching, the line width and the slope of the boundary line near the camera is different from that of a remote part on the camera image. Accordingly, a large number of templates must be prepared. Furthermore, decision processing to change the template is necessary. As a result, the calculation load greatly increases.

SUMMARY OF THE INVENTION

It is an object of the present invention to provide image processing apparatus and method for stably detecting a boundary line toward a vanishing point from the camera image by small calculation load.

According to the present invention, there is provided an image processing apparatus, comprising an image input unit configured to input a plurality of images in a time series where each input image includes a boundary line extending toward a vanishing point on a plane. The apparatus further comprises a reverse projection image generation unit configured to generate a reverse projection image of each input image by projecting information related to or representing each input image onto the plane and a boundary line detection unit configured to detect the boundary line from the reverse projection image by identifying a boundary line candidate on each reverse projection image.

Further in accordance with the present invention, there is also provided an image processing method, comprising inputting a plurality of images in a time series, each input image including a boundary line extending toward a vanishing point on a plane; generating a reverse projection image related to or representing each input image by projecting information of each input image onto the plane; and detecting the boundary line from the reverse projection image by identifying a boundary line candidate on each reverse projection image.

Further in accordance with the present invention, there is also provided a computer program product, comprising a computer readable program code embodied in said product for causing a computer to process an image. The computer readable program code has a first program code to input a plurality of images in a time series, each input image including a boundary line extending toward a vanishing point on a place; a second program code to generate a reverse projection image of each input image by projecting information relating to or representing each input image onto to plane; and a third program code to detect the boundary line from the reverse projection image by identifying a boundary line candidate on each reverse projection image.

BRIEF DESCRIPTION OF THE DRAWINGS

FIG. 12 is a schematic diagram of an example of a boundary line candidate segment table according to an embodiment of the present invention.

FIG. 13 is a schematic diagram of an example of a boundary line candidate table according to an embodiment of the present invention.

DETAILED DESCRIPTION OF THE EMBODIMENT

Figure 1:
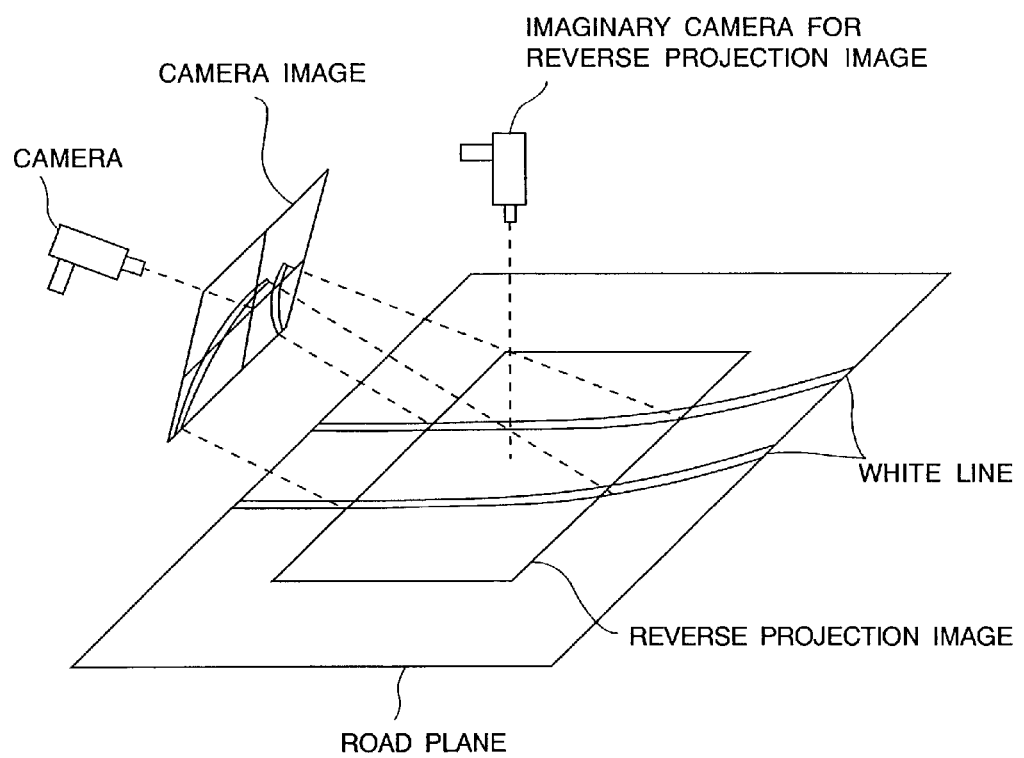
FIG. 1 is a schematic diagram of relationship between the camera image and a reverse projection image according to an embodiment of the present invention.

Various embodiments of the present invention will be explained by referring to the drawings.

In embodiments of the present invention, first, a plurality of images is input in a time series by photographing a scene, such as a road surface in advance of a vehicle. In general, the time series image is projected onto an imaginary plane corresponding to the road plane (hereinafter, this imaginary plane is called a plane), and a projection image is generated upon which information related to or representing the time series image is projected. Last, a boundary line is detected from the projection image.

In the image processing apparatus of the present invention, "a plane" represents the road plane (or more generally the road surface) and "a boundary line" represents a high contrast line, such as the white line or the shoulder of a road as a traveling lane. However, in case that the environment is indoors, the plane can represent a face, such as a floor or a passage, and the boundary line can represent a boundary between a wall and the floor or the passage. A shown in FIG. 1, "a reverse projection image" generally represents an image in which the camera image is projected onto the plane. While the term "reverse" is used, those skilled in the art will appreciate that a reverse projection image as used herein generally refers to any projected image regardless of how the input image is transformed when projected. Briefly, as shown in an imaginary camera for reverse projection image of FIG. 1, the reverse projection image is a plane viewed from a point just above the road plane along a normal direction to the road plane. Furthermore, "a vanishing point" represents a point from which a still object flows into a time series of images as the vehicle advances. In other words, the vanishing point is a point to which a plurality of boundary lines concentrate.

Figure 3A:
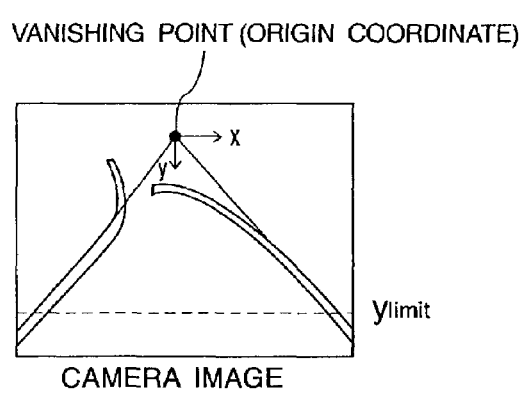
FIGS. 3A and 3B are schematic diagrams of an origin coordinate on the camera image and the reverse projection image according to an embodiment of the present invention.
Figure 3B:
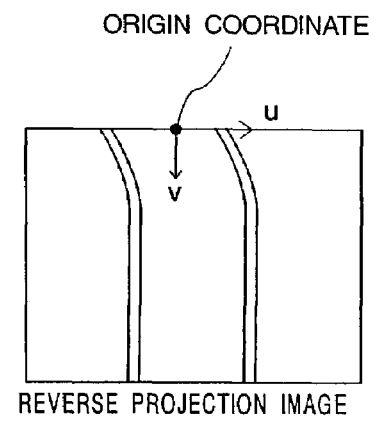

Next, an exemplary projection method from the input camera image to the reverse projection image is explained. FIG. 3A shows an origin coordinate on the camera image and FIG. 3B shows an origin coordinate of the reverse projection image. The origin coordinate of the camera image is a vanishing point of previous camera image. A conversion expression from a coordinate (x,y) of the camera image shown in FIG. 3A to a coordinate (u,v) of the reverse projection image shown in FIG. 3B is represented as follows.

$$U = \frac{RX}{y}x \quad \text{(A)}$$

$$V = \frac{RY^2}{y} - \frac{RY^2}{y_{limit}}$$

In above expression, "$y_{limit}$" represents a lower limit line of an area to be reversely projected on the camera image. "RX, RY" respectively represents reduction ratio along x-direction and y-direction.

Figure 4:
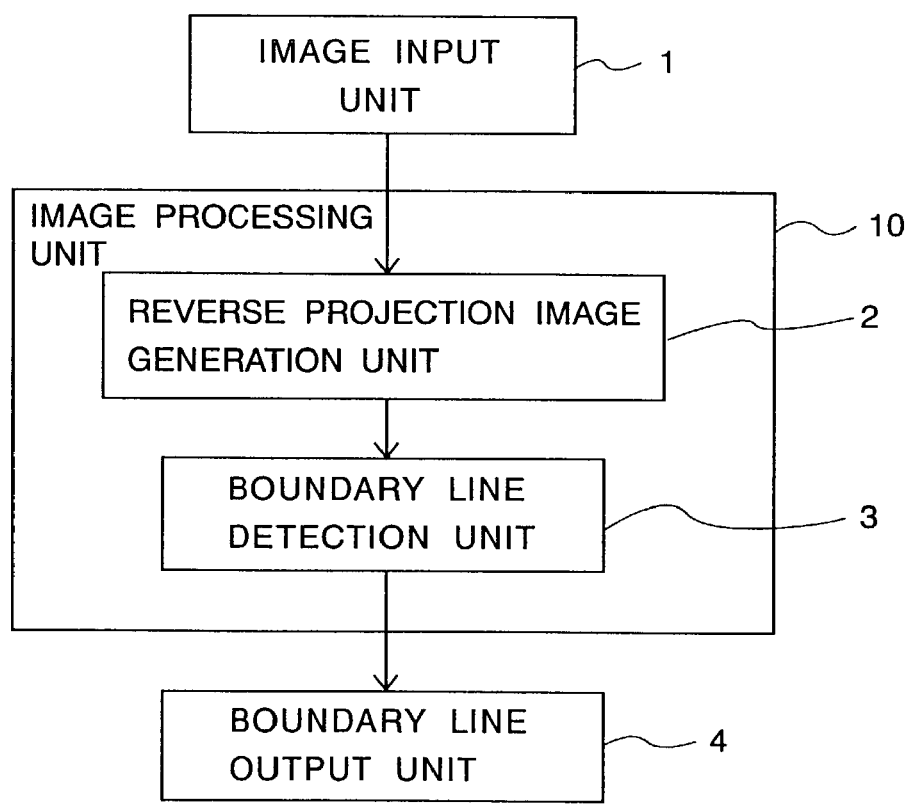
FIG. 4 is a block diagram of the image processing apparatus according to one embodiment of the present invention.

FIG. 4 is a block diagram of an image processing apparatus according to an embodiment of the present invention. As mentioned-above, an image input unit 1 inputs a plurality of images in a time series. In an image processing unit 10, a reverse projection image generation unit 2 generates a reverse projection image, which is the time series image projected onto the plane. Next, a boundary line detection unit 3 detects a boundary line on the plane by referring to the reverse projection image. Hereinafter, a concrete example of the components for each unit is explained.

(1) Image Input Unit 1

The image input unit 1 is, for example, a TV camera to input a plurality of images in a time series. The image input unit is installed onto the front part of the vehicle traveling on the road and inputs each time series image toward advance direction of the vehicle. Hereinafter, each time series image is called a camera image or input image.

(2) Reverse Projection Image Generation Unit 2

Figure 5:
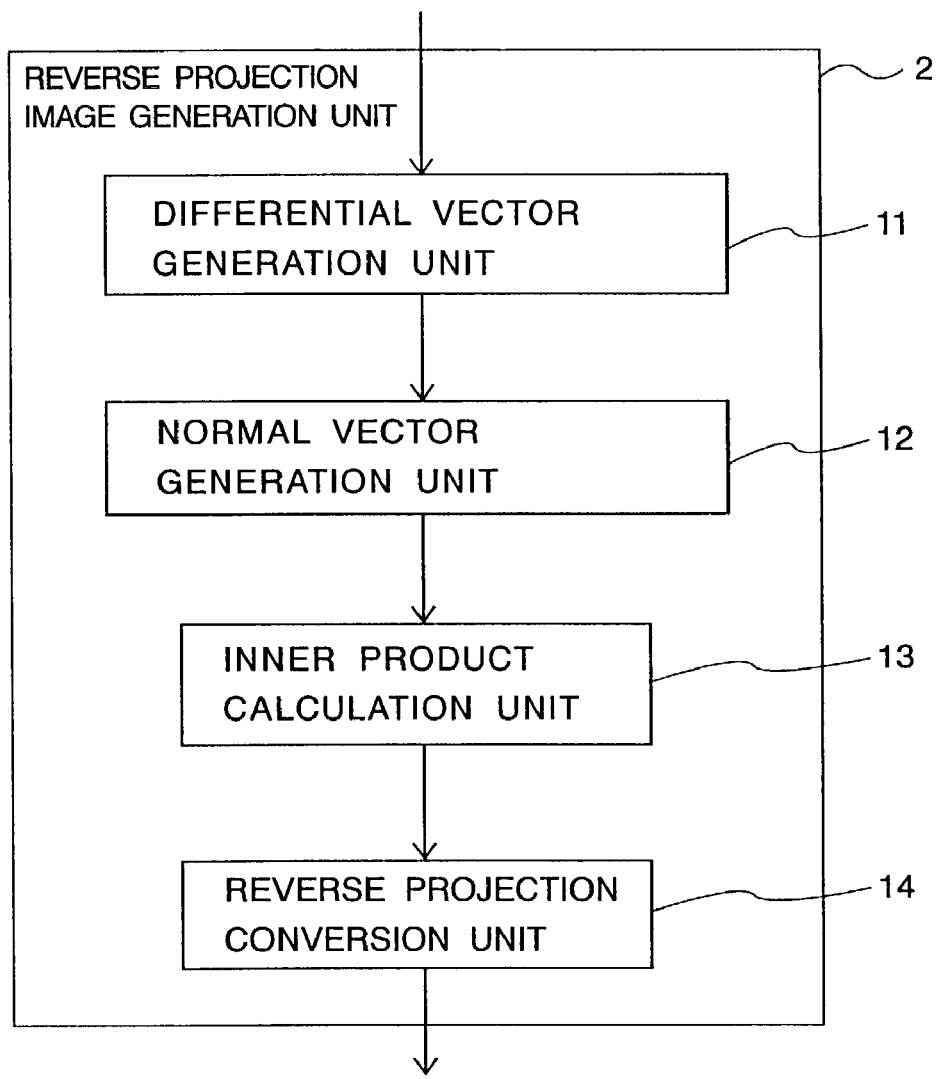
FIG. 5 is a block diagram of a reverse projection image generation in the image processing apparatus shown in FIG. 4.

The reverse projection image generation unit 2 generates a reverse projection image in which the camera image is projected onto a road plane. As shown in FIG. 5, the reverse projection image generation unit 2 includes a differential vector generation unit 11, a normal vector generation unit 12, an inner product calculation unit 13, and a reverse projection conversion unit 14. The differential vector generation unit 11 generates a differential vector of each pixel on the camera image. As mentioned-above, each pixel of the previous camera image is projected onto the road plane, and a boundary line is detected from the reverse projection image. The normal vector generation unit 12 determines a boundary line passing through each pixel on present camera image by using the boundary line detected from the reverse projection image, and generates a normal vector of each pixel at which the determined boundary line passes. The inner product calculation unit 13 calculates an inner product between the differential vector and the normal vector of each pixel on the present camera image. The reverse projection conversion unit 14 generates an edge reverse projection image onto which the inner product value is projected onto the road plane.

(2-1) Differential Vector Generation Unit 11

In the differential vector generation unit 11, a differential vector (dx, dy) for the intensity value of each pixel on the camera image is calculated using a first order differential filter. Briefly, the intensity gradient of each pixel is calculated. For example, by using a Sobel filter such as "3×3" or "5×5", edge dx along horizontal direction and edge dy along vertical direction are calculated and the differential vector is generated based on the edges dx and dy.

(2-2) Normal Vector Generation Unit 12

In the normal vector generation unit 12, a boundary line passing through each pixel is determined or assumed on the camera image. If this boundary line is a curved line, it is regarded that a curvature between two continuous frames (two camera images continuously inputted) does not almost change. As mentioned-later, the curvature of a circular arc extrapolated by a boundary line extrapolation unit 23 on previous camera image is calculated. Accordingly, a boundary line passing through each pixel on present camera image is assumed by using the curvature of the extrapolated boundary line of the previous camera image. Then, a normal direction of each pixel for the boundary line is regarded as a normal vector. A vector perpendicular to a tangent at a point for curved boundary line is a normal vector. If the boundary line is a straight line, a normal direction perpendicular to the straight line is calculated and regarded as a normal vector common to each pixel.

Figure 6:
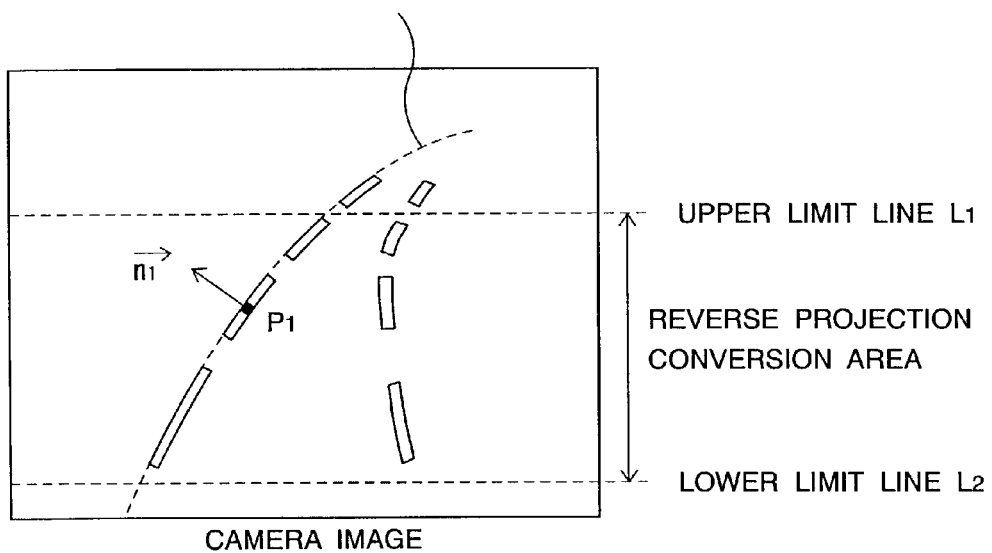
FIG. 6 is a schematic diagram of an example of generation of normal vector on the camera image according to an embodiment of the present invention.

In FIG. 6, an upper limit line L1 and a lower limit line L2 are set on the camera image to define a reverse projection conversion area. The reverse projection conversion area is only projected onto the plane to generate the reverse projection image. An area above the upper limit line on the camera image is distant from the camera location. In comparison with this side area, resolution of this far area is low and precisely detecting the boundary line in this area becomes difficult. Accordingly, a boundary line in this far area is not detected from the reverse projection image. The upper limit line is set at the bottom side of the vanishing point on the camera image. Furthermore, the lower limit line is set on the camera image in order to exclude unnecessary part such as a bonnet or hood of the vehicle taken in the camera image. The lower limit is a lower edge of the camera image.

A boundary line outside the reverse projection conversion area is extrapolated using the curvature of a boundary line of the reverse projection conversion area of which the resolution is relatively high. In the example method for calculating a normal vector, as mentioned-above, a boundary line on the reverse projection image of previous camera image is extrapolated, and a curvature of the extrapolated boundary line is calculated. The extrapolated boundary line is called a reference curved line. By referring to the curvature, a boundary line passing through each pixel on the present camera image is determined. For example, as shown in a dotted line of FIG. 6, a boundary line passing through a point P1 is assumed. A normal direction of the assumed boundary line at the point P1 is calculated as a normal vector n1. In this way, by utilizing the curvature of the reference curved line detected from the reverse projection image of previous camera image (previous frame), a boundary line passing through each pixel is assumed for the present camera image (present frame). Accordingly, as for each pixel on the present camera image, an edge intensity along normal direction for the boundary line is assumptively calculated.

In the normal vector generation unit 12, the boundary line can be assumed as a parabola by using second order differential coefficient. Furthermore, a method for approximating the boundary line is not limited to the second curved line of the above-mentioned explanation. The boundary line can be approximated by multidimensional polynomial expression or other methods.

(2-3) Inner Product Calculation Unit 13

Figure 7:
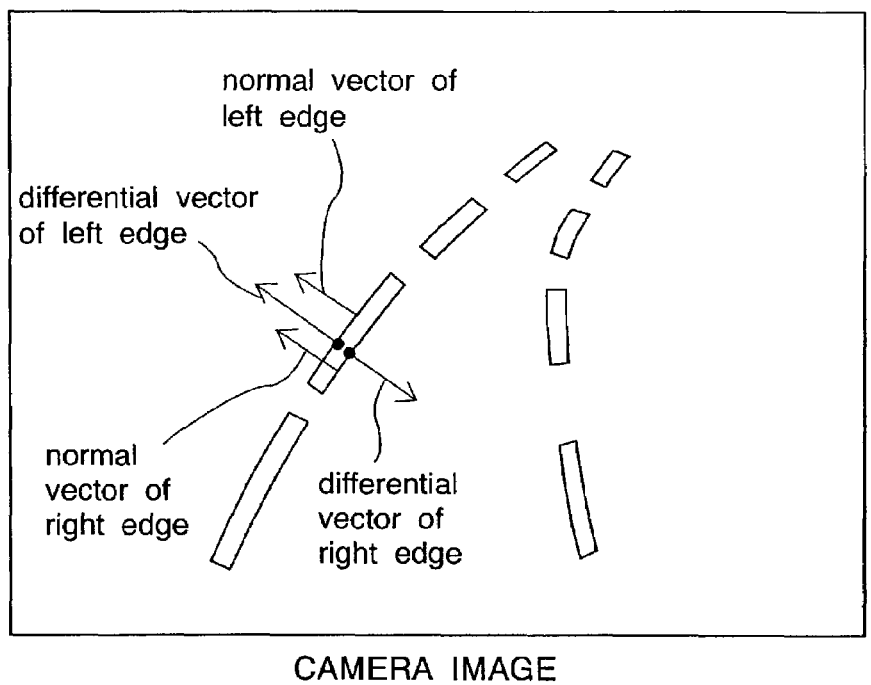
FIG. 7 is a schematic diagram of a relationship between a differential vector and a normal vector of the left edge and right edge of the boundary line on the camera image according to an embodiment of the present invention.

In the inner product calculation unit 13, an inner product between the differential vector and the normal vector of each pixel on the camera image is calculated, and the edge intensity of each pixel along the normal direction for the boundary line is calculated based on the inner product. In an example, the inner product of a left side edge of the boundary line is positive value and the inner product of right side of the boundary line is negative value. As shown in FIG. 7, as for the white line on the road plane, the left side edge includes an intensity gradient from white to black, and the right side edge includes intensity gradient from black to white. The intensity gradient is a differential vector. In FIG. 7, as for the left edge of the white line, a direction of the differential vector is equal to a direction of the normal vector. Accordingly, the inner product between the differential vector and the normal vector is a positive value. On the other hand, as for the right edge of the white line, a direction of the differential vector is reverse for a direction of the normal vector. Accordingly, the inner product between the differential vector and the normal vector is a negative value.

(2-4) Reverse Projection Conversion Unit 14

Figure 8:
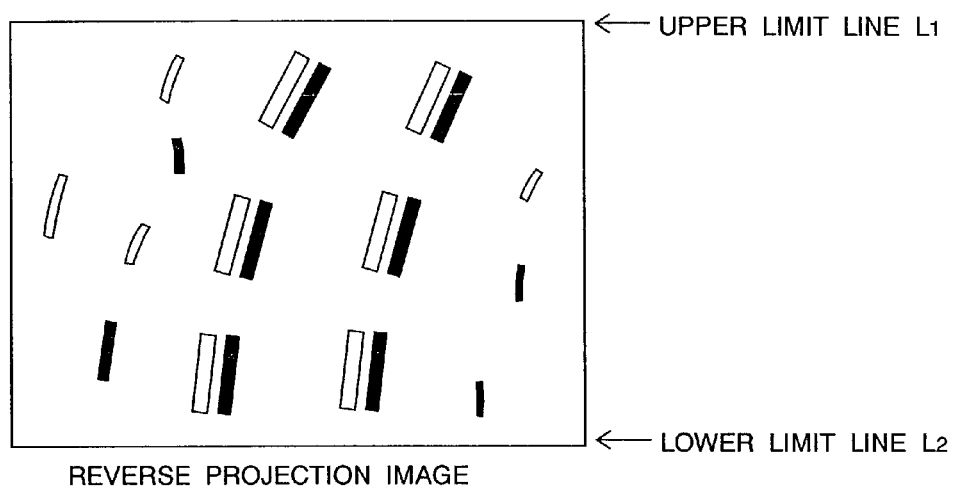
FIG. 8 is a schematic diagram of an example of an inner product of the differential vector and the normal vector on the reverse, projection image according to an embodiment of the present invention.

In the reverse projection conversion unit 14, the inner product value of each pixel is projected as edge information of each pixel onto the road plane. As a result, an edge reverse projection image consisting of the inner product value of each pixel is created. Concretely, as shown in FIG. 8, a scalar image in which the left side edge of the boundary line is a positive pixel value (e.g., white segment in FIG. 8) and the right side edge of the boundary line is negative pixel value (e.g., black segment in FIG. 8) can be created. As mentioned-above, in the camera image, the inner product of the left side edge of the white line is a positive value and the inner product of the right side edge of the white line is a negative value. Accordingly, in the edge reverse projection image, the projected boundary line corresponding to the white line is represented as a string of paired segments. Each pair of segments consists of a positive value (e.g., a white segment) and a negative value (e.g., a black segment). As shown in the reverse projection image of FIG. 8, two projected boundary lines corresponding to the left white line and the right white line are two parallel straight lines at the lower part on the image. The two projected boundary lines are two parallel curved lines, each of which is curved at almost predetermined curvature at the upper point on the image. In both cases, the two projected boundary lines are represented as two parallel lines (two straight lines or two curved lines) on the reverse projection image. As a result, the two projected boundary lines can be more easily detected by following boundary line detection unit 3.

(3) Boundary Line Detection Unit 3.

Figure 9:
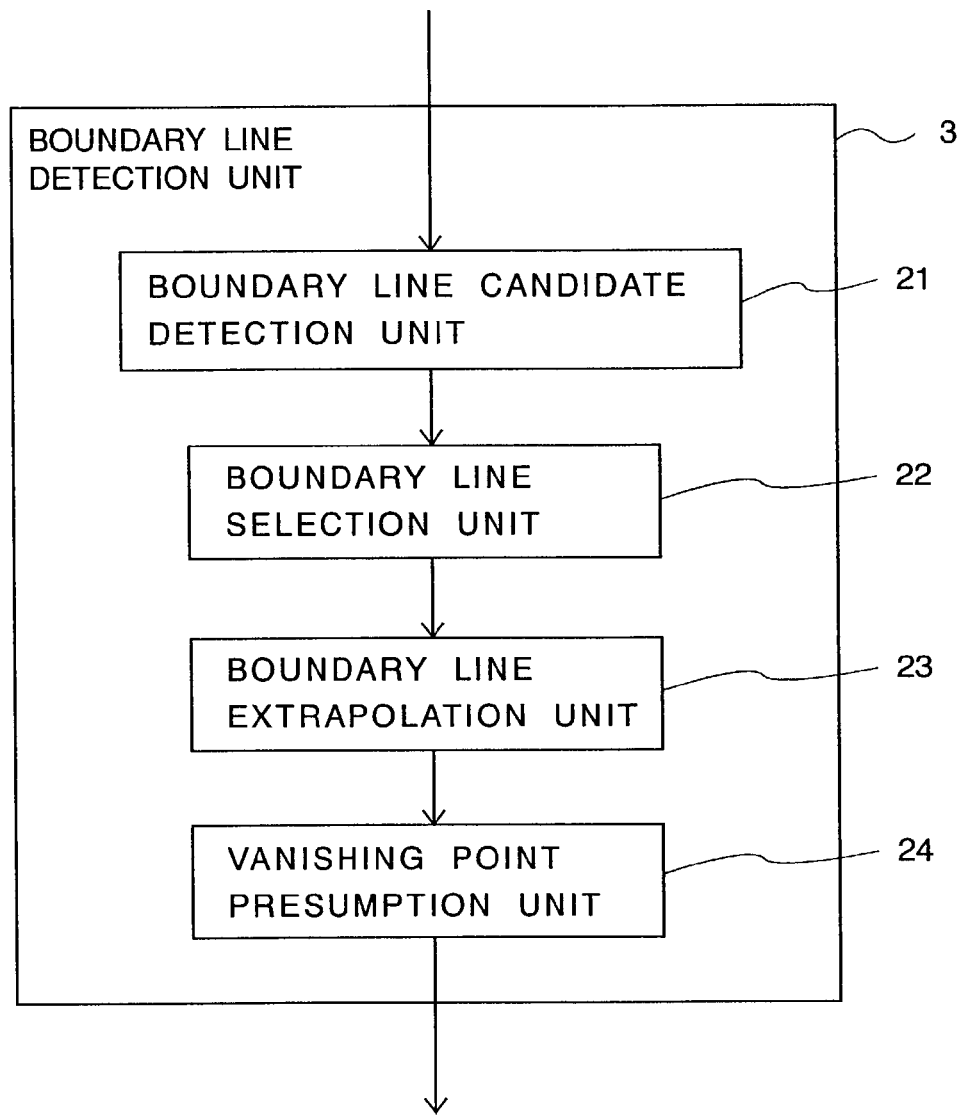
FIG. 9 is a block diagram of an exemplary boundary line detection unit in the image processing apparatus shown in FIG. 4

As shown in FIG. 9, the boundary line detection unit 3 includes a boundary line candidate detection unit 21, a boundary line selection unit 22, a boundary line selection unit 22, a boundary line extrapolation unit 23, and a vanishing point presumption unit 24. The boundary line candidate detection unit 21 detects a boundary line candidate from the reverse projection image. The boundary line selection unit 22 selects an actual boundary line from a plurality of the boundary line candidates detected by the boundary line candidate direction unit 21. The boundary line extrapolation unit 23 extrapolates the depth part of the boundary line selected by the boundary line selection unit 22. The vanishing point presumption unit 24 determines or presumes a vanishing point from the extrapolated boundary line projected onto the camera image.

(3-1) Boundary Line Candidate Detection Unit 21

Figure 10:
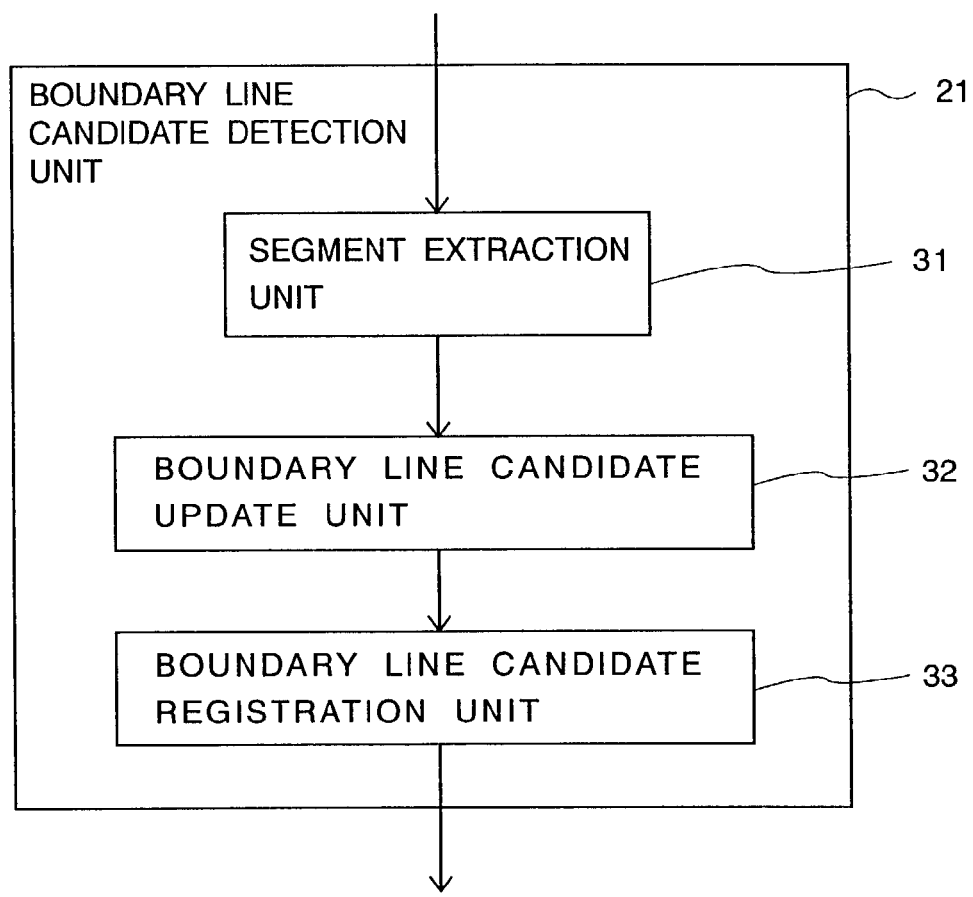
FIG. 10 is a block diagram of an exemplary boundary line candidate detection unit in the boundary line detection unit shown in FIG. 9.

As shown in FIG. 10, the boundary line candidate detection unit 21 includes a segment extraction unit 31, a boundary line candidate update unit 32, and a boundary line candidate registration unit 33. The segment extraction unit 31 extracts a boundary line candidate segment from the reverse projection image. The boundary line candidate update unit 32 determines a correspondence between the boundary line candidate segment extracted by the segment extraction unit 31 and the boundary line candidate detected from the previous camera image. The boundary line candidate registration unit 33 registers a new boundary line candidate by unifying a plurality of boundary line candidate segments extracted by the segment extraction unit 31.

(3-1-1) Segment Extraction Unit 31

First, in the segment extraction unit 31, smoothing is executed for the reverse projection image and a noise element is excluded from the smoothed image as post processing. This smoothing can be executed using a Gaussian filter. Next, by scanning each horizontal line on the reverse projection image, a peak pixel value is respectively detected from the positive value area and the negative value area. Whenever the peak pixel value is detected from one horizontal line, the horizontal line to be scanned is shifted by one pixel along a vertical direction, and a peak pixel value is detected in the same way. On a previous horizontal line and the present horizontal line shifted along vertical direction, if a difference between two positions of each peak pixel is below a threshold, each peak pixel on the previous horizontal line and the present horizontal line is connected as a segment (positive value segment or negative value segment) and the same processing is executed for the next horizontal line. This processing is executed for all horizontal lines on the reverse projection image. As a result, a segment connecting positive peak pixels and a segment connecting negative peak pixels are generated.

Figure 11:
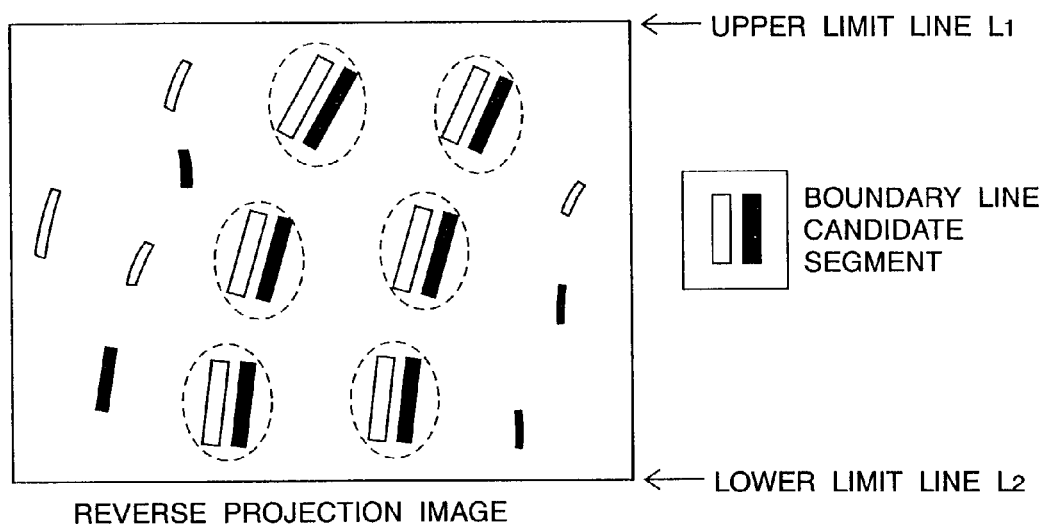
FIG. 11 is a schematic diagram of an example of a boundary line candidate segment extracted from the reverse projection image according to an embodiment of the present invention.

Next, as shown in FIG. 11, a pair of segments (positive peak pixels and negative peak pixels) is extracted as a boundary line candidate segment from the positive value segments and the negative value segments on the reverse projection image. Because the projected white line is represented as a pair of left side edge (positive peak pixels) and right side edge (negative peak pixels) on the reverse projection image. FIG. 12 shows an example of a boundary line candidate segment table. Whenever the boundary line candidate segment is extracted from the reverse projection image, an attribute value (such as one or more of a horizontal position, line width, average edge intensity, length along vertical direction) of each boundary line candidate segment is stored in the boundary line candidate segment table. The meaning of each kind of example attribute value listed above is explained further below.

(3-1-2) Boundary Line Candidate Update Unit 32

In the boundary line candidate update unit 32, if a boundary line candidate (e.g., white line candidate) is already extracted from the previous camera images, the attribute value of each boundary line candidate is stored in order of priority degree in a boundary line candidate table. FIG. 13 shows an example of the boundary line candidate table. As shown in FIG. 13, the example attribute value of each boundary line candidate includes a continuance time, an average edge intensity, a detection time, a disappearance time, a horizontal position and a line width. The continuance time represents the number of frames in which the boundary line candidate is continuously detected. The average edge intensity represents an average of intensity values of all pixels included in the boundary line candidate. The detection time represents the number of frames passed from a frame in which the boundary line candidate is first detected. The disappearance time represents the number of frames passed from a frame in which the boundary line is last detected. The horizontal position includes a starting point and an end point. In one embodiment, the starting point represents an X-coordinate of the boundary line candidate on the lower limit line (the lower end) of the reverse projection image. Likewise, the end point represents an X-coordinate of the boundary line candidate on the upper limit line (the upper end) of the reverse projection image. The line width represents a width of the boundary line candidate along a horizontal direction (X-direction) on the reverse projection image. In FIG. 13, a priority degree of the boundary line candidate is determined based on the continuance time, the average edge intensity, the detection time and the disappearance time. For example, the priority degree is in order of longer continuance time. Alternatively, the priority degree may be in order of the weighted sum of each attribute value.

Next, by referring to the boundary line candidate of higher priority degree, it is decided whether a plurality of boundary line candidate segments can be merged as being similar. Concretely, if a difference of each attribute value (e.g., the average edge intensity, the horizontal position, the line width) between each boundary line candidate segment and one boundary line candidate is below a threshold, each boundary line candidate segment is decided to belong to the one boundary line candidate, and each boundary line candidate segment is merged to the one boundary line candidate and identified as such. In this case, it is decided whether each boundary line candidate segment can be connected. Concretely, if a difference of each attribute value (e.g., the horizontal position, the line width, the average edge intensity, the length along vertical direction) between each two boundary line candidate segments neighbored is below a threshold, it is decided that these boundary line candidate segments can be connected as a boundary line candidate. Last, the attribute value of the one boundary line candidate is updated using the attribute value of each connectable boundary line candidate segment in the boundary line candidate table.

(3-1-3) Boundary Line Candidate Registration Table 33

In the boundary line candidate registration table 33, if at least one boundary line candidate segment is not merged to the boundary line candidate exists on the reverse projection image, it is decided whether the boundary line candidate segment is located on this side of the reverse projection image and whether a length of the boundary line candidate segment is above a threshold. If this condition is satisfied, the boundary line candidate segment is registered as new boundary line candidate in the boundary line candidate table. This is because the resolution of this side is higher than the resolution of the depth side on the reverse projection image and the boundary line candidate of high reliability can be extracted from this side. If another boundary line candidate segment that is smoothly connectable to the new boundary line candidate exists on the depth part of the reverse projection image, another boundary line candidate segment is also merged to the new boundary line candidate in the boundary line candidate table.

(3-2) Boundary Line Selection Unit 22

In the boundary line selection unit 22, two boundary lines corresponding to the right and left white lines are selected from the boundary line candidates of which the attribute value is updated or newly registered in the boundary line candidate table. Concretely, the two boundary lines can be selected based upon a condition (e.g., the horizontal position, the average edge intensity, a horizontal distance between two boundary line) of two boundary lines.

(3-3) Boundary Line Extrapolation Unit 23

Figure 14:
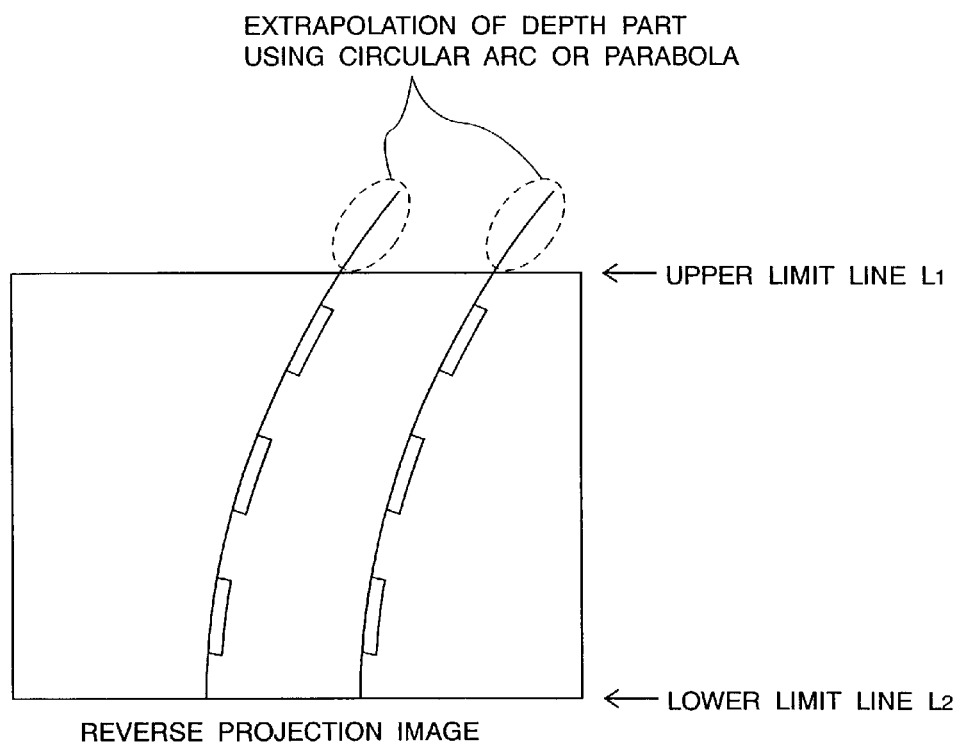
FIG. 14 is a schematic diagram of an example of the boundary line of which depth part is extrapolated on the reverse projection image according to an embodiment of the present invention.

In the boundary line extrapolation unit 23, when two boundary lines corresponding to the right and left white lines are selected, a curvature of each pixel of the two boundary lines is calculated and an average of curvatures of all pixels is calculated as a curvature of the two boundary lines. As shown in FIG. 14, depth parts of the two boundary lines are respectively extrapolated by circular arc using the curvature of the boundary lines. Furthermore, by calculating an average of weighted sum of curvatures for each pixel of the two boundary lines, the depth parts of the two boundary lines may be extrapolated using the average curvature. The boundary line of which the depth part is extrapolated is called a reference curved line.

The above-mentioned extrapolation method is based on a fact that the curvature of the boundary line is regarded as a predetermined value on the reverse projection image. Furthermore, the information quantity of the boundary line candidate segment of this side is larger than that of the depth side on the reverse projection image, and the curvature is stably calculated from the boundary line candidate of this side. Accordingly, a boundary line of the depth part can be presumed using the curvature of the boundary line of this side on the reverse projection image. Furthermore, in the boundary line extrapolation unit 23, the reference curved line may be generated by a parabola. On the reverse projection image, however, it is proper that curved line can be extrapolated as a circular arc of a predetermined curvature. However, by using a parabola extrapolated by a second order differential coefficient, the precision of the process can be maintained without significant degradation. Furthermore, the boundary line may be approximated by a polynomial above second order.

Figure 15:
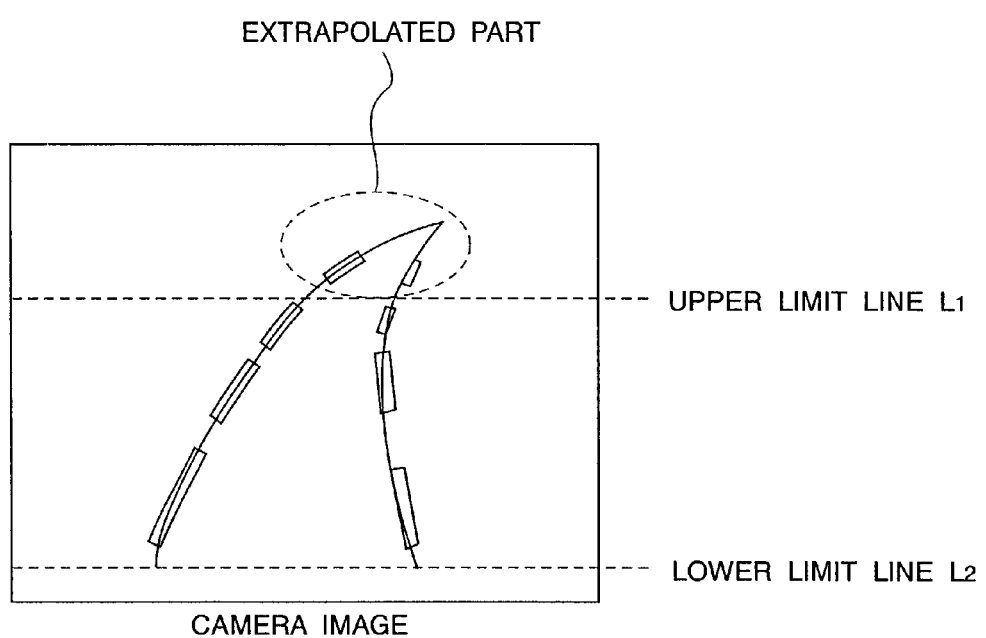
FIG. 15 is a schematic diagram of an example of the projection of the boundary line including an extrapolated part onto the camera image according to an embodiment of the present invention.

Last, as shown in FIG. 15, a coordinate value of each pixel of the reference curved line on the reverse projection image is projected onto the camera image. In one embodiment, by using a reverse conversion expression for above-mentioned expression (A), a coordinate (u, v) of the reverse projection image is converted to a coordinate (x, y) of the camera image.

(3-4) Vanishing Point Presumption Unit 24

Figure 16:
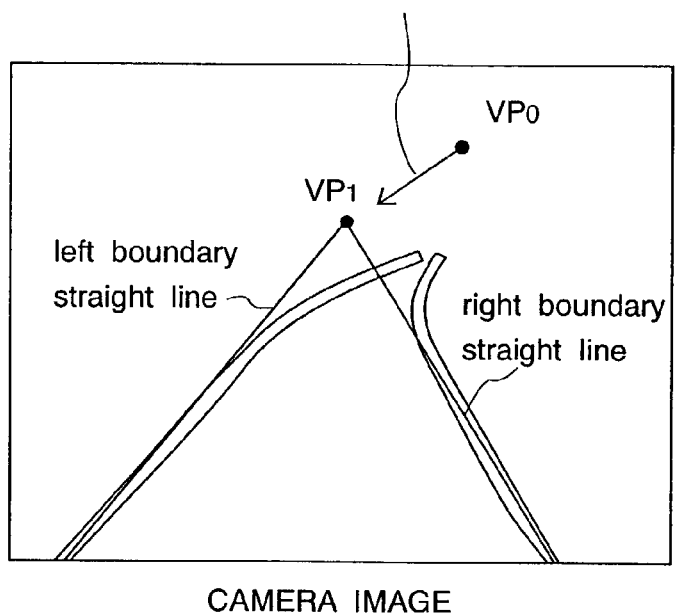
FIG. 16 is a schematic diagram of an example of a determination of a vanishing point using two boundary lines or the camera image according to an embodiment of the present invention.

In the vanishing point presumption unit 24, a position of a vanishing point is presumed or identifies the boundary line on the camera image. FIG. 16 shows an example of the camera image onto which the reference curved line is projected as the two boundary lines. In FIG. 16, a left boundary straight line is generated by linear-approximation of this side of a left boundary line with an average of first order differentiation. In the same way, a right boundary straight line is generated by linear-approximation of this side of a right boundary line with an average of first order differentiation. By using each direction of the left boundary straight line and the right boundary straight line, a vanishing point VP1 is presumed or identified as a cross point of two directions on the present camera image (present frame). Based on the vanishing point VP1, a reverse projection image of the next camera image (next frame) is created. In the embodiment mentioned-above, the vanishing point VP1 is regarded as an origin coordinate of the next camera image. Accordingly, by using the expression (A) and the origin coordinate, the next camera image can be projected onto a road plane or surface (an example of the reverse projection image).

Furthermore, as shown in FIG. 16, the vanishing point VP1 may be regarded as a temporary vanishing point of the present frame, and an interpolated point between the temporary vanishing point VP1 and a vanishing point VP0 of the previous frame may be regarded as a vanishing point of the present frame. In this way, by gradually correcting a vanishing point, a large change of the reverse projection image between frames in the time series can be eliminated, and the boundary line candidate of each frame is easily corresponded between frames in the time series. By executing this interpolation processing, the ability to account for vehicle's shaking can be accomplished.

(4) Boundary Line Output Unit 4

Figure 17:
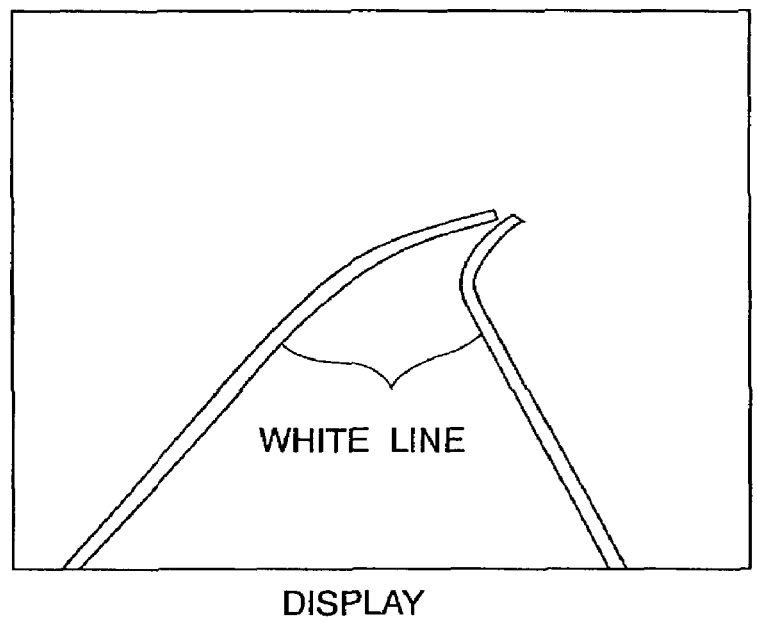
FIG. 17 is a schematic diagram of example of the white line on a display according to an embodiment of the present invention.

In the boundary line output unit 4, the boundary line detected by the boundary line detection unit 3 can be displayed as the camera image. Concretely, as shown in FIG. 17, the reference curved line on the reverse projection image is already projected onto the camera image. Accordingly, this camera image including the projected boundary line (e.g., white line) is displayed as itself. As a result, a fast moving vehicle can be quickly controlled using a position of the white line on the camera image.

(Modifications)

In an alternative embodiments, in the reverse projection image generation unit 2, the reverse projection image including edge information is generated. However, by projecting multivalue information of the camera onto a road plane, a multivalue reverse projection image may be generated. In this case, in the reverse projection image generation unit 2, as shown in FIG. 6, multivalues of each pixel on a reverse projection conversion area of the camera image can be reversely projected onto the road plane in order to generate the multivalue reverse projection image.

In the case of detecting a boundary line from the multivalue reverse projection image, a method of the segment extraction unit 31 in the boundary line candidate detection unit 21 can be adapted as follows. First, as the preprocessing, smoothing can be executed for all areas of the multi-value reverse projection image and a noise element is excluded from the multivalue reverse projection image. For example, Gaussian filter is used for the smoothing. Next, by scanning a horizontal line on the multivalue reverse projection image, a peak pixel of an intensity value is searched. When the peak pixel is detected, the horizontal line to be scanned is shifted by one pixel along vertical direction on the multivalue reverse projection image and a peak pixel of the intensity value is searched in the same way. On a previous horizontal line and the present horizontal line shifted along vertical direction, if a difference between two positions of each peak pixel is below a threshold, each peak pixel on the previous horizontal line and the present horizontal line is connected as a segment and the same processing is executed for the next horizontal line. This processing is executed for all horizontal lines on the multivalue reverse projection image. As a result, a segment connecting each peak pixel is generated. This segment can be extracted as a boundary line candidate segment.

As mentioned-above, embodiments of the present invention may advantageously benefit from at least one of the following.

(1) In order to stably extract a boundary line (e.g., a high contrast line such as a white line) on a road plane, it is necessary that a boundary line candidate is correctly detected. In the extraction processing of a boundary line candidate segment as a basic processing to extract the boundary line candidate, a threshold processing such as binalization may not be needed in embodiments of the invention. Accordingly, robust detection of the boundary line can be realized in the case of bad situations for inputting the camera image such as rain weather.

(2) In the extraction processing of the boundary line candidate segment, the decision of which attribute value of the boundary line candidate segment can alternatively be executed by a strict condition. The boundary line can be accordingly detected by using the boundary line candidate segment strictly decided. Accordingly, error detection of the boundary line may be greatly reduced.

Figure 2A:
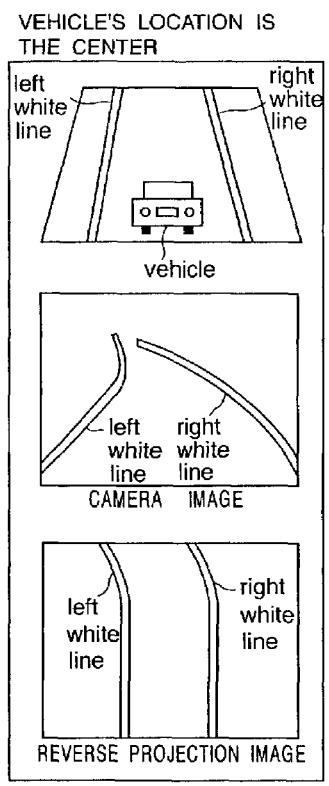
FIGS. 2A, 2B and 2C are schematic diagrams of the relationship between the vehicle's moving location and the camera image or the reverse projection image according to an embodiment of the present invention.
Figure 2B:
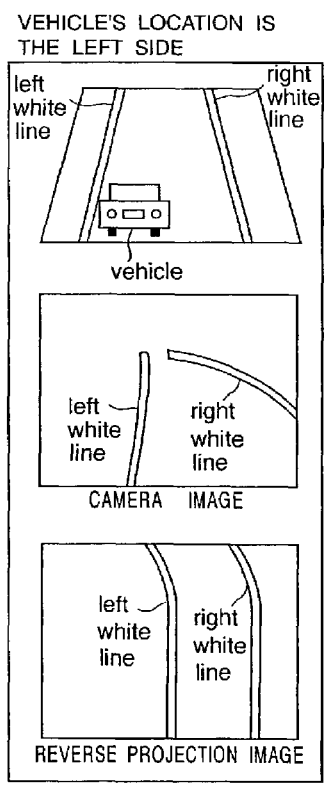
Figure 2C:
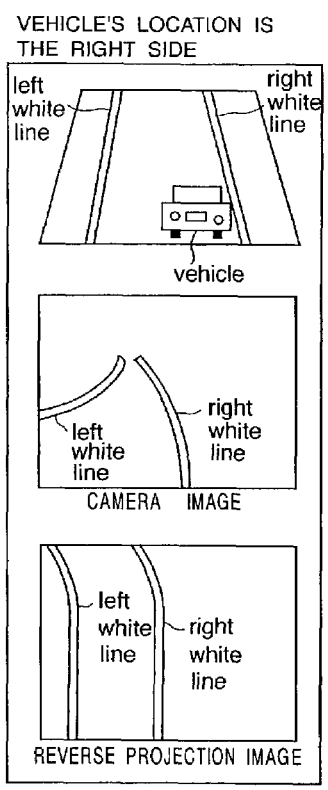

(3) As shown in FIG. 1, the camera image is reversely projected onto the road plane and the extraction processing of the boundary line candidate is executed on the reverse projection image. If a boundary line is a straight line on the camera image, the boundary line is converted to a straight line existing along a vertical direction on the reverse projection image. If a boundary line is a curved line on the camera image, the boundary line is converted to a curved line of a predetermined curvature. In both cases, two boundary lines are converted to two parallel lines of which a space between is substantially fixed. Briefly, as shown in FIGS. 2A, 2B and 2C, the location change of a traveling vehicle can be represented as parallel movement of the two white lines. Accordingly, by searching a peak pixel of intensity value along a horizontal direction and by shifting the horizontal pixels line to be searched along vertical direction on the reverse projection image, the boundary line candidate is correctly detected and calculation load greatly reduces.

(4) Whenever a plurality of boundary line candidate segments is detected from a present frame (present camera image), it is decided whether the boundary line candidate segment belongs to a boundary line candidate detected from a previous frame (previous camera image) and an attribute value of the boundary line candidate is updated based on the decision result. In one embodiment, by referring to the attribute value of each boundary line candidate on adjacent frames, the boundary line can be selected from the boundary line candidates. Accordingly, even if the boundary line candidate is unexpectedly missing from one frame, this non-detection may not affect on detection of the boundary line, and robustability along time-axis direction is very high.

For embodiments of the present invention, the processing of the image processing apparatus of the present invention can be accomplished by computer-executable program, and this program can be realized in a computer-readable memory device.

In embodiments of the present invention, the memory device, such as a magnetic disk, floppy disk, hard disk, optical disk (CD-ROM, CD-R, DVD, and so on), optical magnetic disk (MD, and so on) can be used to store instructions for causing a processor or computer to perform the processes described above.

Furthermore, based on an indication of the program installed from the memory device to the computer, OS (operation system) operating on the computer, or MW (middle ware software), such as database management software or network, may execute one part of each processing to realize the embodiments.

Furthermore, the memory device is not limited to a device independent from the computer. By downloading a program transmitted through a LAN or the Internet, a memory device in which the program is stored is included. Furthermore, the memory device is not limited to one. In the case that the processing of the embodiments is executed by a plurality of memory devices, the plurality of memory devices may be included in the memory device. The component of the device may be arbitrarily composed.

In embodiments of the present invention, the computer executes each processing stage of the embodiments according to the program stored in the memory device. The computer may be one apparatus such as a personal computer or a system in which a plurality of processing apparatuses are connected through the network. Furthermore, in the present invention the computer is not limited to the personal computer. Those skilled in the art will appreciate that a computer includes a processing unit in an information processor, a micro computer, and so on. In short, the equipment and the apparatus that can execute the functions in embodiments of the present invention using the program are generally called the computer.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. An image processing apparatus comprising:
an image input unit configured to input a plurality of images in a time series, each input image including a boundary line extending toward a vanishing point on a plane;
a reverse projection image generation unit configured to calculate a differential vector of an intensity value of a pixel on an input image, to calculate a normal vector of the pixel for a direction of the boundary line passing through the pixel, to calculate an inner product value between the differential vector and the normal vector of the pixel on the input image, and to project the inner product value of the pixel onto the plane, the plane onto which the inner product value is projected being a reverse projection image; and a boundary line detection unit configured to detect the boundary line from the reverse projection image based on the inner product value.

2. The image processing apparatus according to claim 1, wherein said reverse projection image generation unit determines the direction of the boundary line passing through the pixel by using a curvature of the boundary line detected from the previous input image in the time series to calculate the normal vector.

3. The image processing apparatus according to claim 1, wherein said reverse projection image generation unit calculates the inner product value between the differential vector and the normal vector for a left side edge and a right side edge of the boundary line.

4. The image processing apparatus according to claim 3, wherein said reverse projection image generation unit sets an upper limit line and a lower limit line to define a reverse projection conversion area on the input image, and projects the inner product value of each of the pixels included in the reverse projection area onto the plane.

5. The image processing apparatus according to claim 3, wherein said boundary line detection unit detects a first segment by connecting at least two positive peaks of the inner product value on the reverse projection image, detects a second segment by connecting at least two negative peaks of the inner product value on the reverse projection image, and extracts the first segment and the second segment as a first boundary line candidate segment from the reverse projection image.

6. The image processing apparatus according to claim 5, wherein said boundary line detection unit identifies a second boundary line candidate segment having at least one similar attribute with the first boundary line candidate segment, and registers the similar attribute of the first and second boundary line candidate segments as a boundary line candidate in a boundary line candidate table.

7. The image processing apparatus according to claim 6, wherein the registered attribute comprises at least one of an average edge intensity, a line width, a horizontal position having at least a starting point and an end point, a continuance time as the number of frames in which the boundary line candidate is continuously detected, a detection time as the number of frames passed since the boundary line candidate is first detected, and a disappearance time as the number of frames passed since the boundary line candidate is last detected.

8. The image processing apparatus according to claim 7, wherein said boundary line detection unit decides that a new boundary line candidate segment detected from the reverse projection image is the same as the boundary line candidate registered in the boundary line candidate table if an attribute of the new boundary line candidate segment is similar to the registered attribute of the boundary line candidate, and updates the registered attribute of the boundary line candidate in the boundary line candidate table according to the attribute of the new boundary line candidate segment.

9. The image processing apparatus according to claim 8, wherein said boundary line detection unit selects the boundary line as a left white line and a second boundary line as a right white line from the boundary line candidates registered in the boundary line candidate table according to the registered attribute of each boundary line candidate.

10. The image processing apparatus according to claim 9, wherein said boundary line detection unit calculates the curvature of each of the two boundary lines, and extrapolates a depth part of each of the two boundary lines on the reverse projection image by using at least one of a circular arc and a parabola of the curvature.

11. The image processing apparatus according to claim 10, wherein said boundary line detection unit projects each pixel of the two boundary lines onto the camera image, and determines a vanishing point by using a position of the two boundary lines on the camera image.

12. The image processing apparatus according to claim 11, wherein said boundary line detection unit interpolates a new vanishing point by using the vanishing point of the present camera image and a vanishing point of the previous camera image.

13. The image processing apparatus according to claim 11, wherein the vanishing point of the previous camera image is regarded as an origin coordinate of the present camera image, and wherein said reverse projection image generation unit projects information of the present camera image onto the plane by using the origin coordinate of the present camera image.

14. The image processing apparatus according to claim 11, further comprising:
a boundary line output unit configured to output the two boundary lines projected onto the camera image.

15. An image processing method, comprising:
inputting a plurality of images in a time series, each input image including a boundary line extending toward a vanishing point on a plane;
calculating a differential vector of an intensity value of a pixel on an input image;
calculating a normal vector of the pixel for a direction of the boundary line passing through the pixel;
calculating an inner product value between the differential vector and the normal vector of the pixel on the input image;
projecting the inner product value of the pixel onto the plane, the plane onto which the inner product value is projected being a reverse projection image; and
detecting the boundary line from the reverse projection image based on the inner product value.

16. A computer readable medium encoded with a computer readable program code for causing a computer to process an image, said computer readable program code having:
a first program code to input a plurality of images in a time series, each input image including a boundary line extending toward a vanishing point on a plane;
a second program code to calculate a differential vector of an intensity value of a pixel on an input image;
a third program code to calculate a normal vector of the pixel for a direction of the boundary line passing through the pixel;
a fourth program code to calculate an inner product value between the differential vector and the normal vector of the pixel on the input image; and
a fifth program code to project the inner product value of the pixel onto the plane.

17. The image processing method according to claim 15, wherein the second calculating step further comprises determining the direction of the boundary line passing through the pixel by using a curvature of the boundary line detected from the previous input image in the time series to calculate the normal vector.

18. The image processing method according to claim 15, wherein the third calculating step further comprises
calculating the inner product value between the differential vector and the normal vector for a left side edge and a right side edge of the boundary line.

19. The image processing method according to claim 18, wherein the projecting step further comprises
setting an upper limit line and a lower limit line to define a reverse projection conversion area on the input image; and
projecting the inner product value of each of the pixels included in the reverse projection area onto the plane.

20. The image processing method according to claim 18, wherein the detecting step further comprises
detecting a first segment by connecting at least two positive peaks of the inner product value on the reverse projection image;
detecting a second segment by connecting at least two negative peaks of the inner product value on the reverse projection image; and
extracting the first segment and the second segment as a first boundary line candidate segment from the reverse projection image.

21. The image processing method according to claim 20, wherein the detecting step further comprises
identifying a second boundary line candidate segment having at least one similar attribute with the first boundary line candidate segment; and
registering the similar attribute of the first and second boundary line candidate segments as a boundary line candidate in a boundary line candidate table.

22. The image processing method according to claim 21, wherein the registered attribute comprises at least one of an average edge intensity, a line width, a horizontal position having at least a starting point and an end point, a continuance time as the number of frames in which the boundary line candidate is continuously detected, a detection time as the number of frames passed since the boundary line candidate is first detected, and a disappearance time as the number of frames passed since the boundary line candidate is last detected.

23. The image processing method according to claim 22, wherein the detecting step further comprises
deciding that a new boundary line candidate segment detected from the reverse projection image is the same as the boundary line candidate registered in the boundary line candidate table if an attribute of the new boundary line candidate segment is similar to the registered attribute of the boundary line candidate; and
updating the registered attribute of the boundary line candidate in the boundary line candidate table according to the attribute of the new boundary line candidate segment.

24. The image processing method according to claim 23, wherein the detecting step further comprises
selecting the boundary line as a left white line and a second boundary line as a right white line from the boundary line candidates registered in the boundary line candidate table according to the registered attribute of each boundary line candidate.

25. The image processing method according to claim 21, wherein the detecting step further comprises
calculating a curvature of each of the two boundary lines and extrapolating a depth part of each of the two boundary lines on the reverse projection image by using at least one of a circular arc and a parabola of the curvature.

26. The image processing method according to claim 25, wherein the detecting step further comprises
projecting each pixel of the two boundary lines onto the camera image; and
determining a vanishing point by using a position of the two boundary lines on the camera image.

27. The image processing method according to claim 26, wherein the detecting step further comprises
interpolating a new vanishing point by using the vanishing point of the present camera image and a vanishing point of the previous camera image.

28. The image processing method according to claim 26, wherein the vanishing point of the previous camera image is regarded as an origin coordinate of the present camera image, and
wherein the projecting step further comprises
projecting information of the present camera image onto the plane by using the origin coordinate of the present camera image.

29. The image processing method according to claim 26, further comprising:
outputting the two boundary lines projected onto the camera image.

30. The computer readable medium according to claim 16,
wherein the third program code further comprises a program code to determine the direction of the boundary line passing through the pixel by using a curvature of the boundary line detected from the previous input image in the time series to calculate the normal vector.

31. The computer readable medium according to claim 16,
wherein the fourth program code further comprises a program code to calculate the inner product value between the differential vector and the normal vector for a left side edge and a right side edge of the boundary line.

32. The computer readable medium according to claim 31,
wherein the fifth program code further comprises a program code to set an upper limit line and a lower limit line to define a reverse projection conversion area on the input image, and a program code to project the inner product value of each of the pixels included in the reverse projection area onto the plane.

33. The computer readable medium according to claim 32,
wherein the sixth program code further comprises a program code to detect a first segment by connecting at least two positive peaks of the inner product value on the reverse projection image, a program code to detect a second segment by connecting at least two negative peaks of the inner product value on the reverse projection image, and a program code to extract the first segment and the second segment as a first boundary line candidate segment from the reverse projection image.

34. The computer readable medium according to claim 33, wherein the sixth program code further comprises a program code to identify a second boundary line candidate segment having at least one similar attribute with the first boundary line candidate segment, and a program code to register the similar attribute of the first and second boundary line candidate segments as a boundary line candidate in a boundary line candidate table.

35. The computer readable medium according to claim 34, wherein the registered attribute comprises at least one of an average edge intensity, a line width, a horizontal position having at least a starting point and an end point, a continuance time as the number of frames in which the boundary line candidate is continuously detected, a detection time as the number of frames passed since the boundary line candidate is first detected, and a disappearance time as the number of frames passed since the boundary line candidate is last detected.

36. The computer readable medium according to claim 35, wherein the sixth program code further comprises a program code to decide that a new boundary line candidate segment detected from the reverse projection image is the same as the boundary line candidate registered in the boundary line candidate table if an attribute of the new boundary line candidate segment is similar to the registered attribute of the boundary line candidate, and a program code to update the registered attribute of the boundary line candidate in the boundary line candidate table according to the attribute of the new boundary line candidate segment.

37. The computer readable medium according to claim 36, wherein the sixth program code further comprises a program code to select the boundary line as a left white line and a second boundary line as a right white line from the boundary line candidates registered in the boundary line candidate table according to the registered attribute of each boundary line candidate.

38. The computer readable medium according to claim 37, wherein the sixth program code further comprises a program code to calculate a curvature of each of the two boundary lines, and a program code to extrapolate a depth part of each of the two boundary lines on the reverse projection image by using at least one of a circular arc and a parabola of the curvature.

39. The computer readable medium according to claim 38, wherein the sixth program code further comprises a program code to project each pixel of the two boundary lines onto the camera image, and a program code to determine a vanishing point by using a position of the two boundary lines on the camera image.

40. The computer readable medium according to claim 39, wherein the sixth program code further comprises a program code to interpolate a new vanishing point by using the vanishing point of the present camera image and a vanishing point of the previous camera image.

41. The computer readable medium according to claim 39, wherein the vanishing point of the previous camera image is regarded as an origin coordinate of the present camera image, and wherein the fifth program code further comprises a program code to project information of the present camera image onto the plane by using the origin coordinate of the present camera image.

42. The image processing apparatus according to claim 39, further comprising:

a seventh program code to output the two boundary lines projected onto the camera image.

* * * * *